United States Patent
Rich et al.

(10) Patent No.: US 7,658,441 B2
(45) Date of Patent: Feb. 9, 2010

(54) SUNROOF SEAL

(75) Inventors: Stewart Rich, Powell, OH (US); Brock Stull, Columbus, OH (US); Akihiko Kuribayashi, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/208,580

(22) Filed: Sep. 11, 2008

(65) Prior Publication Data
US 2009/0072577 A1    Mar. 19, 2009

Related U.S. Application Data

(60) Provisional application No. 60/973,617, filed on Sep. 19, 2007.

(51) Int. Cl.
*B60J 10/12* (2006.01)
(52) U.S. Cl. .................. 296/216.09; 49/498.1
(58) Field of Classification Search ........... 296/216.06, 296/216.09; 49/498.1
See application file for complete search history.

(56) References Cited

U.S. PATENT DOCUMENTS

| | | | | |
|---|---|---|---|---|
| 5,170,587 | A * | 12/1992 | Nakatani et al. | 49/490.1 |
| 6,390,543 | B1 | 5/2002 | Tolinski | |
| 6,491,341 | B2 * | 12/2002 | Grimm et al. | 296/216.09 |
| 6,811,213 | B2 | 11/2004 | Yamashita et al. | |
| 6,832,451 | B2 | 12/2004 | Yamashita et al. | |
| 6,893,084 | B2 * | 5/2005 | Tamura et al. | 296/216.09 |

* cited by examiner

*Primary Examiner*—Dennis H Pedder
(74) *Attorney, Agent, or Firm*—Mark E. Duell; Rankin, Hill & Clark LLP

(57) ABSTRACT

A seal assembly for a sunroof of an automotive vehicle is provided that includes a seal and a bracket. The seal includes a front base and a separate rear base, both of which are attached to a bottom surface of the sunroof. The front base includes a lip integrally joined to a front portion of the front base that extends at an angle in the forward and downward direction. The bracket part is attached to both the front base and the rear base and includes a flange that extends in the angled forward and downward direction similar to that of the lip. The vertical length of the lip is longer than the vertical length of the flange such that the flange is adjacent to and behind the lip.

11 Claims, 2 Drawing Sheets

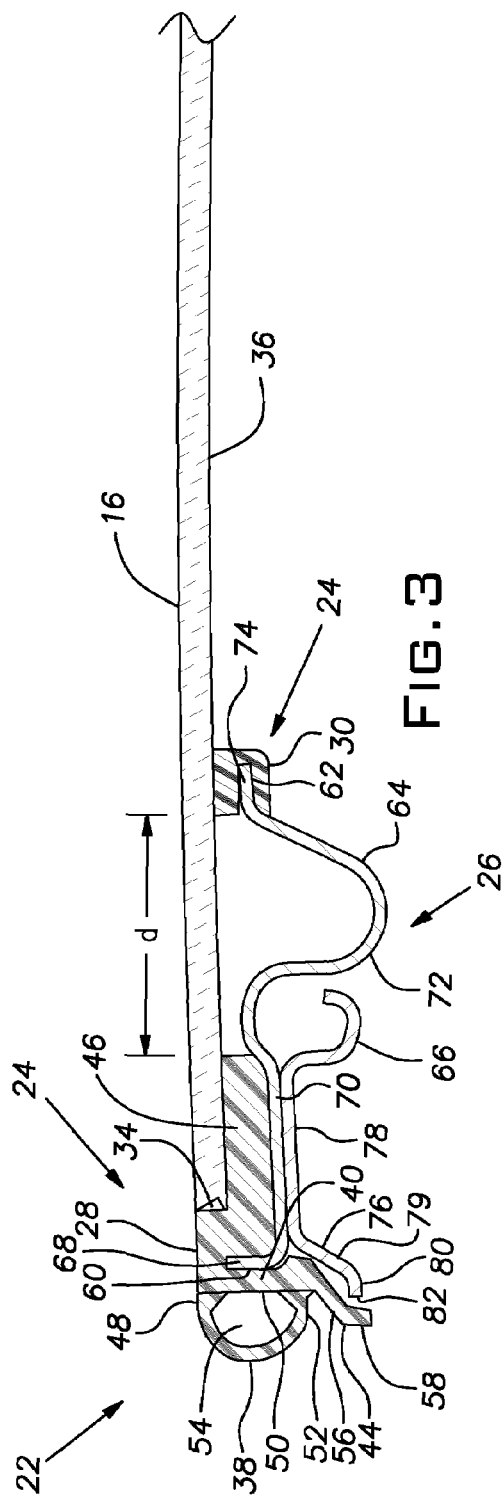
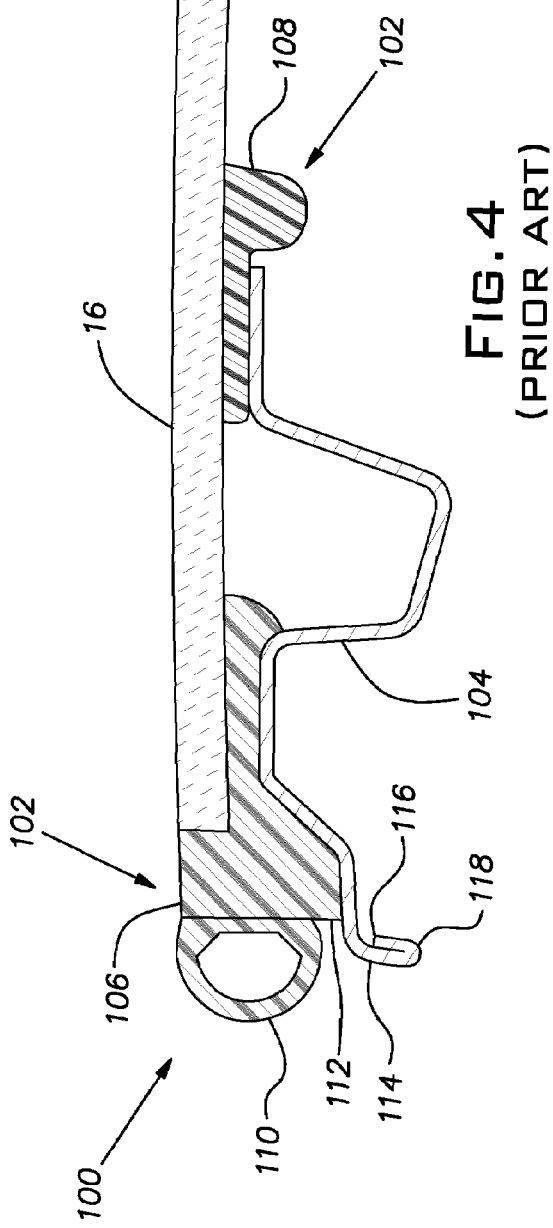

SUNROOF SEAL

BACKGROUND OF THE INVENTION

1. Field of the Invention

The present invention relates to a sunroof of an automotive vehicle and more specifically to an improved seal assembly for use on the sunroof.

2. Description of Related Art

FIG. 4 shows a conventional seal assembly 100 including a seal part 102 and a bracket part 104 for use on a sunroof 14 of an automotive vehicle 10 (see FIG. 1). The seal assembly 100 provides a seal between the sunroof 14 and a roof 12 of the vehicle 10. The seal part 102 includes a front base 106 with a resilient portion 110 and a rear base 108. The front base 106 is attached to both a bottom surface and a front edge surface of a glass portion 16 of the sunroof 14. The rear base 108 is separate from the front base 106 and is attached to the bottom surface of the glass portion 16 at a distance behind the front base 106. The resilient portion 110 is integrally joined to a front edge 112 of the front base 106 and resiliently contacts the roof 12 when the sunroof 14 is in a closed position.

The bracket part 104 is attached to a bottom surface of both the front base 106 and the rear base 108. A front edge 114 of the bracket part 104 extends in a downward direction away from the seal part 102 into a passenger occupancy portion of the vehicle 10. Because the seal part 102 does not cover the front edge 114 a sharp edge 116 may be potentially exposed to the occupants of the vehicle 10 thereby creating a potential health hazard. In order to eliminate the health hazard, the front edge 114 of the bracket part 104 is formed into a hem flange 118. A hem flange is formed by bending an edge of a metal panel inward about 180° so that the edge is folded back on itself. The hem flange forms a smooth-rounded edge thereby eliminating a sharp edge on the metal panel. Thus, the exposed sharp edge 116 on the front edge 114 on the bracket part 104 can be eliminated thereby removing the health hazard to the occupants.

The disadvantage of this seal assembly, however, is that the formation of a hem flange requires an extra production step in the manufacturing of the seal assembly. This extra production step leads to increased manufacturing costs and ultimately increased vehicle costs to the consumer. Thus, what is required is a seal assembly that eliminates the need for a hem flange without sacrificing occupant safety and seal performance.

SUMMARY OF THE INVENTION

In accordance with one aspect, the present invention overcomes the above mentioned disadvantages by providing a seal assembly for a sunroof that includes a seal part and a bracket part. The seal part includes a front base attached to a front edge and a bottom surface of a glass portion of the sunroof and a rear base, which is separate from the front base, and is attached the bottom surface of the sunroof at a distance behind the front base. The front base includes a lip integrally joined to a front portion of the front base. The lip extends at an angle in the forward and downward direction. The bracket part is attached to both the front base and the rear base. The bracket includes a flange that extends in the angled forward and downward direction similar to that of the lip. The vertical length of the lip is longer than the vertical length of the flange such that the flange is adjacent to and behind the lip.

In accordance with another aspect, the present invention provides a resilient arc portion integrally attached to the front portion of the front base. The integrated joining of the resilient arc portion and the front base define a cavity whereby the lip extends adjacent to and below the resilient arc portion.

Additional benefits and advantages of the present invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings that form a part of the specification.

FIG. 3 is a cross-section view of FIG. 2 taken along line 3-3.

FIG. 4 is a cross-section view of a conventional seal assembly.

DETAILED DESCRIPTION OF THE INVENTION

Figure 1:
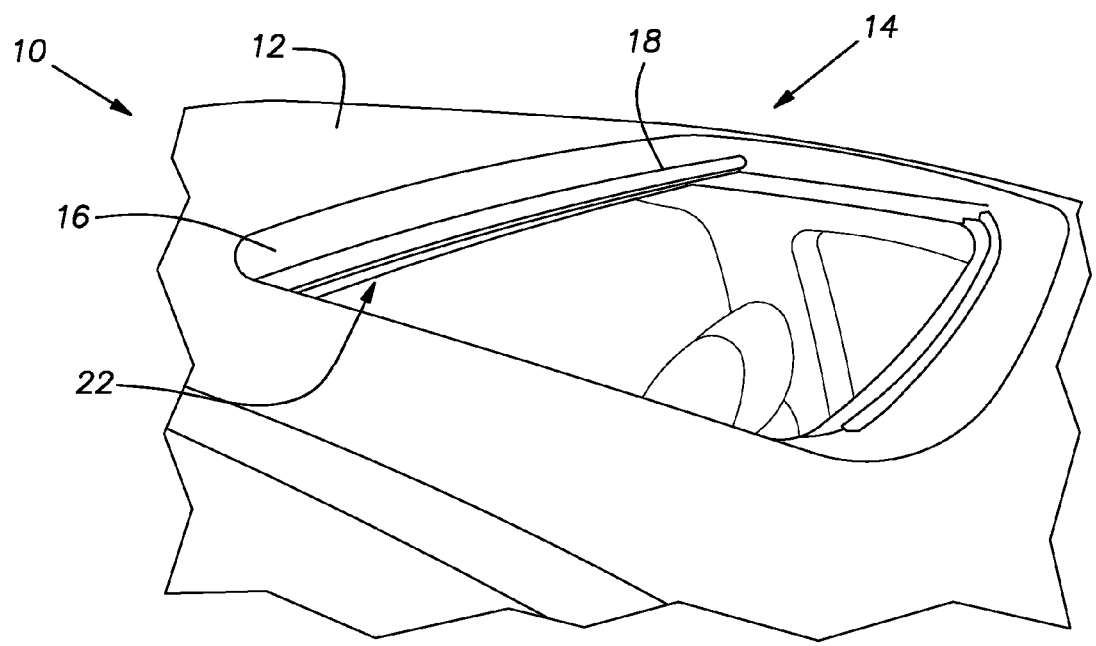
FIG. 1 is a perspective view of a roof of a vehicle provided with a seal assembly in accordance with the present invention.
Figure 2:
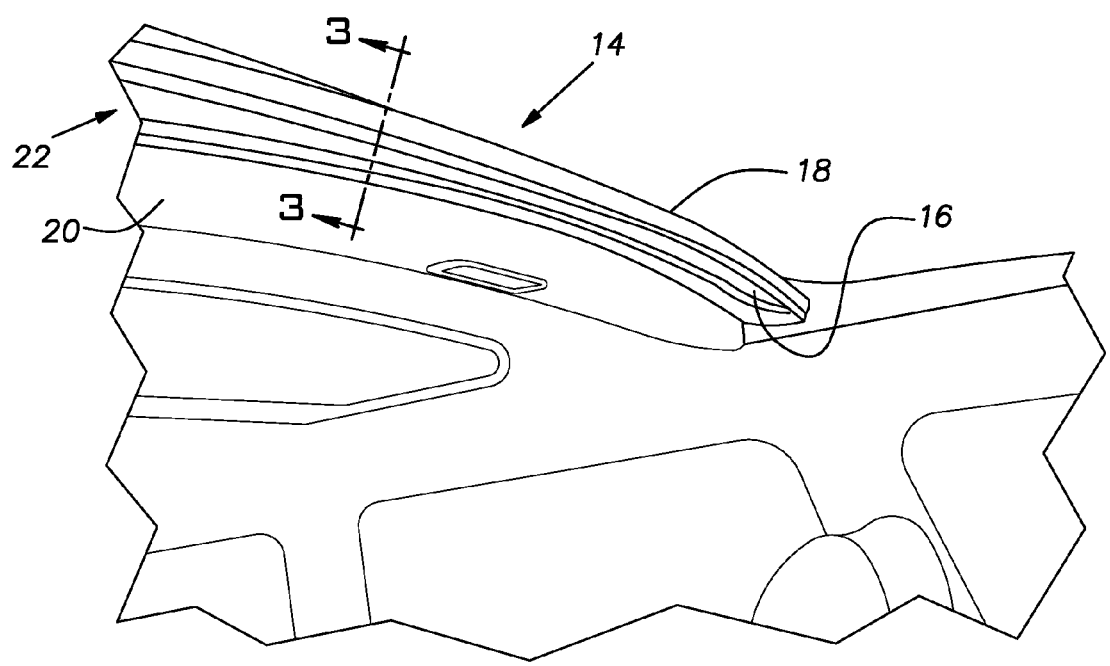
FIG. 2 is a perspective view of the seal assembly as seen from inside the vehicle.

Referring now to the drawings, FIGS. 1 and 2 show partial views of an automotive vehicle 10 having a roof 12 and a sunroof 14 situated within the roof 12. The sunroof 14 includes a glass portion 16 with a perimeter 18, a cover portion 20 situated adjacent to and below the glass portion 16, and a seal assembly 22. Both the glass portion 16 and the cover portion 20 are slidable within the roof 12 between a closed position and an open position (shown open in FIGS. 1 and 2).

Referring to FIGS. 2 and 3, the seal assembly 22 is attached to the perimeter 18 of the glass portion 16 and provides a seal between the glass portion 16 of the sunroof 14 and the roof 12 of the vehicle 10. The seal assembly 22 includes a seal part 24 and a bracket part 26. The bracket part 26 serves as a frame for the sunroof 14 and secures the seal part 24 to the glass portion 16.

The seal part 24 includes a front base 28 and a rear base 30 where the front base 28 and rear base 30 are two separate pieces. The front base 28 is adhered or attached, in a manner commonly known in the art, to both a front edge 34 and a bottom surface 36 of the glass portion 16 of the sunroof 14. The front base 28 is fully integrated and includes a resilient arc portion 38, a front portion 40, a lip 44 and a rear portion 46. An upper end 48 of the arc portion 38 is integrally joined to a front edge 50 of the front portion 40 such that a top surface of the upper end 48 is flush with a top surface of the front portion 40. A lower end 52 of the arc portion 38 is integrally joined to the front edge 50 slightly above the lip 44. The integration of the arc portion 38 to the front edge 50 of the front portion 40 defines a cavity 54 therein. The lip 44 is an integrated extension of the front portion 40 and includes an angled portion 56 and a vertical extension 58. The angled portion 56 extends at a downward angle toward the front of the vehicle 10 such that the angled portion 56 is situated adjacent to and below the arc portion 38. The vertical extension 58 extends in a downward vertical direction from a distal end of the angled portion 56 and extends in front of a portion of the bracket part 26, as will be described further below. The front portion 40 and the vertical extension 58 of the lip 44 define a first plane and a second plane, respectively, and are generally parallel to but horizontally spaced relative to one another. A vertical channel 60 is defined between the front portion 40 and the rear portion 46 of the front base 28 and receives a front portion of the bracket part 26, as will be described further below.

The rear base 30 is separated from the front base 28 and is adhered to or attached, in a manner commonly known in the art, to the bottom surface 36 of the glass portion 16 at a distance d behind the front base 28. The rear base 30 has a U-shaped cross-section that defines a horizontal channel 62, which receives a rear portion of the bracket part 26, as will be described further below.

The bracket part 26 includes an upper bracket 64 and a lower bracket 66. The upper bracket 64 includes a vertical portion 68, a front horizontal portion 70, an S-shaped portion 72, and a rear horizontal portion 74. The upper bracket 64 is attached to the seal part 24 such that the vertical portion 68 is inserted into the vertical channel 60, the front horizontal portion 70 is adhered or attached, in manner commonly known in the art, to a bottom surface of the front base 28, and the rear horizontal portion 74 is inserted into the horizontal channel 62. The S-shaped portion 72 integrally joins the front horizontal portion 70 to the rear horizontal portion 74.

The lower bracket 66 includes a front flange 76 and a horizontal portion 78. The horizontal portion 78 attaches to the front horizontal portion 70 of the upper bracket to thereby form the bracket part 24. The lower bracket 66 can be attached to the upper bracket 64 by any means known in the art such as, for example, with an adhesive, by welding, with screws, rivets, etc. The front flange 76 includes an angled portion 79 and a horizontal extension 80. The angled portion 79 extends at a downward angle toward the front of the vehicle 10 at a similar angle as the angled portion 56 of the front base 28. The horizontal extension 80 horizontally extends from a distal end of the angled portion 79 toward the front of the vehicle 10.

The lip 44 and the front flange 76 of the lower bracket 66 are situated such that the front flange 76 is adjacent to and behind the lip 44. The lip 44, however, extends downwardly past the front flange 76 such that a distal end of the vertical extension 58 extends past a distal end of the front flange 76 thereby covering the front flange 76. Thus, the vertical extension 58 of the lip 44 conceals an edge 82 of the horizontal extension 80 of the front flange 76 so as to protect a vehicle occupant from accidentally contacting the front flange 76 of the lower bracket 66. Therefore, because the front flange 76 is concealed and no longer a health hazard to the vehicle occupants, the need to hem the front flange 76 is eliminated. Thus, the extra production step required in the conventional seal assembly 100 is eliminated, thereby reducing manufacturing costs.

While specific embodiments of the invention have been described and illustrated, it is to be understood that these embodiments are provided by way of example only and that the invention is not to be construed as being limited but only by proper scope of the following claims.

What is claimed is:

1. A seal assembly for a sunroof comprising:
   a front base operatively attached a front edge and a bottom surface of the sunroof;
   a rear base separated from the front base and operatively attached to the bottom surface of the sunroof at a distance behind the front base;
   a lip integrally joined to the front base, the lip extending in an angled forward and downward direction; and
   a bracket operatively attached to the front base and the rear base, the bracket including a flange extending, at an end portion, in the angled forward and downward direction, wherein the flange is adjacent to and behind the lip, and wherein the lip extends downwardly past the flange such that the lip covers the flange.

2. The seal assembly of claim 1 further comprising a resilient arc portion integrally attached to a front portion of the front base, wherein the integrally joined resilient arc portion and the front base define a cavity, and wherein the lip extends adjacent to and below the resilient arc portion.

3. The seal assembly of claim 2, wherein the bracket includes an upper bracket and a lower bracket, wherein the upper bracket is operatively attached to the front and rear base, wherein the lower bracket is operatively attached to the upper bracket, and wherein the flange extends from the lower bracket.

4. The seal assembly of claim 3, wherein the lip portion includes a vertical portion, wherein the front portion of the front base defines a first plane and the vertical portion defines a second plane, and wherein the first plane and the second plane are horizontally spaced from and generally parallel to each other.

5. The seal assembly of claim 4, wherein the front base includes a front portion and a rear portion, wherein a vertical channel is defined between the front portion and the rear portion, and wherein the rear base has a U-shaped cross-section that defines a horizontal channel.

6. The seal assembly of claim 5, wherein the bracket includes a vertical portion and a rear horizontal portion, wherein the vertical portion engages the vertical channel of the front base and the rear horizontal portion engages the horizontal channel of the rear base.

7. A combination seal and bracket for a sunroof having a glass portion for an automotive vehicle comprising:
   a seal part having a front base operatively attached to a bottom surface and a front edge of the glass portion and a rear base operatively attached to the bottom surface of the glass portion at a distance behind the front base, the front base including a front portion;
   a lip integrally joined to the front portion, the lip including an angled portion extending at an angled forward and downward direction and a vertical extension vertically extending from a distal end of the angled portion; and
   a bracket part having an upper bracket operatively attached to the seal part and a lower bracket operatively attached to the upper bracket, the lower bracket including a flange having an angled portion extending at the forward and downward direction and a horizontal extension extending from a distal end of the angled portion toward a front of the vehicle,
   wherein a distal end of the vertical extension extends past a distal end of the horizontal extension such that the lip covers the flange.

8. The combination of claim 7 further comprising a resilient arc portion integrally attached to the front portion of the front base, wherein the integrally joined resilient arc portion and the front base define a cavity, and wherein the angled portion of the lip extends adjacent to and below the resilient arc portion.

9. The combination of claim 8, wherein the front portion of the front base defines a first plane and the vertical extension defines a second plane, and wherein the first plane and the second plane are horizontally spaced from and generally parallel to each other.

10. The combination of claim 9, wherein a vertical channel is defined between the front portion and a rear portion of the front base and wherein the rear base has a U-shaped cross-section that defines a horizontal channel.

11. The combination of claim 10, wherein the upper bracket includes a vertical portion, a front horizontal portion, an S-shaped portion, and a rear horizontal portion, wherein the vertical portion engages the vertical channel of the front base and the rear horizontal portion engages the horizontal channel of the rear base, wherein the front horizontal portion is operatively attached to a bottom surface of the front base, and wherein the S-shaped portion integrally joins the front horizontal portion to the rear horizontal portion.

* * * * *